US008035371B2

(12) United States Patent
Budde et al.

(10) Patent No.: US 8,035,371 B2
(45) Date of Patent: Oct. 11, 2011

(54) MEASURING SYSTEM FOR DETECTING A ROTARY-LINEAR DISPLACEMENT AND CORRESPONDING ROTARY-LINEAR DRIVE

(75) Inventors: Thomas Budde, Würzburg (DE); Aziz Inalkac, Neukirchen-Vluyn (DE); Mykhaylo Toldonov, Bamberg (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 280 days.

(21) Appl. No.: 12/375,806

(22) PCT Filed: Apr. 30, 2008

(86) PCT No.: PCT/EP2008/055294
§ 371 (c)(1),
(2), (4) Date: Jan. 30, 2009

(87) PCT Pub. No.: WO2008/132221
PCT Pub. Date: Nov. 6, 2008

(65) Prior Publication Data
US 2009/0302832 A1 Dec. 10, 2009

(30) Foreign Application Priority Data
Apr. 30, 2007 (DE) .......................... 10 2007 020 274

(51) Int. Cl.
*G01B 7/14* (2006.01)
(52) U.S. Cl. .......... 324/207.23; 324/207.24; 324/207.25
(58) Field of Classification Search .............. 310/68, 310/12.28, 12.19, 80, 12.14; 324/207.23, 324/207.24, 207.25
See application file for complete search history.

(56) References Cited

U.S. PATENT DOCUMENTS

| 5,105,932 A | * | 4/1992 | Bryson et al. ................. 198/619 |
| 5,600,189 A | * | 2/1997 | Van Geel et al. ........... 310/40 R |
| 5,610,491 A | * | 3/1997 | Gotz et al. .................... 318/625 |
| 6,098,517 A | * | 8/2000 | Thorwart et al. ................ 92/68 |
| 6,118,199 A | * | 9/2000 | Lembke ....................... 310/90.5 |
| 6,719,174 B1 | * | 4/2004 | Swift ............................. 222/333 |
| 6,798,087 B1 | * | 9/2004 | Swift ......................... 310/12.26 |
| 7,285,883 B2 | * | 10/2007 | Bott et al. .................... 310/75 R |

FOREIGN PATENT DOCUMENTS

| DE | 10 2004 001 010 A1 | 10/2004 |
| DE | 20 2004 015 853 U1 | 2/2005 |
| EP | 1 418 039 A2 | 5/2004 |
| JP | 2002 361699 A | 12/2002 |
| JP | 2005 119172 A | 5/2005 |

* cited by examiner

*Primary Examiner* — Melissa Koval
*Assistant Examiner* — Temilade S Rhodes-Vivour
(74) *Attorney, Agent, or Firm* — Henry M. Feiereisen; Ursula B. Day

(57) ABSTRACT

The invention relates to more accurate rotative and linear positional measurement for a rotary-linear drive. A measuring system comprising a linear sensor (12) and a rotary sensor (20) is disclosed. A decoupling unit (11,14,17) decouples the rotary displacement from the linear displacement of a shaft (10). The decoupling unit (11,14,17) has either a first measuring section (11), which is coupled in a fixed manner to the shaft to be measured (10) and tapped by the linear sensor (12) and a second measuring section (17), which is exclusively non-rotatably coupled to the shaft to be measured (10) and is tapped by the rotary sensor (20), or a first measuring section, which is coupled in a fixed manner exclusively linearly to the shaft to be measured and is tapped by the linear sensor and a second measuring section, which is non-rotatably coupled to the shaft to be measured and is tapped by the rotary sensor. In each case, the linear displacement is decoupled from the rotary displacement for the measuring process, permitting high-resolution standard measuring sensors to be used.

18 Claims, 4 Drawing Sheets

MEASURING SYSTEM FOR DETECTING A ROTARY-LINEAR DISPLACEMENT AND CORRESPONDING ROTARY-LINEAR DRIVE

BACKGROUND OF THE INVENTION

The present invention relates to a measuring system for detecting a rotary-linear displacement of a shaft comprising a linear sensor and a rotary sensor. In particular, the present invention relates to a rotary-linear drive which is equipped with such a measuring system.

A drive, particularly an injector and metering unit in a plastic injection molding machine or similar machine applications requires the implementation of a rotary displacement and a linear displacement on the drive shaft. It must be possible to generate these displacements independently of one another, on the one hand, but also superimposed. Control of the combined drive requires implementation of a rotary and linear positional measurement with the aid of a measuring system.

Hitherto, rotary-linear drives were available which have, for example, the structure reproduced in FIG. 1. The drive consists of a rotary drive 1 and a linear drive 2 which are arranged axially behind one another and linearly and rotationally move a common shaft 3. The combined displacement is measured or detected with two sensors 4 and 5. The rotary sensor 4 detects an angular position of the magnetic field of magnets 6 which are arranged in a hollow shaft 7 which is permanently connected to the shaft 3. The linear sensor 5 in a tube section 8 which protrudes into the hollow shaft 7 and at which the rotary sensor 4 is mounted registers changes in inductance which are caused by magnets 9 which are arranged at the hollow shaft 7.

The rotary sensor 4 and the linear sensor 5 are in each case invariant with respect to the displacement which is not to be measured. However, the accuracy of this measuring system is not suitable for all applications.

SUMMARY OF THE INVENTION

In particular, this measuring system cannot meet the requirements of certain injection molding machines in which very accurate positioning capability is required. This is because it may especially be necessary to determine the rotary position to an accuracy of 1° and the linear position to an accuracy of 0.1 mm.

The object of the present invention thus consists in providing a measuring system which provides for very accurate positional control of a rotary rotation drive.

According to the invention, the object is achieved by a measuring system for detecting a rotary-linear displacement of a shaft by means of a linear sensor and a rotary sensor, and a decoupling device for decoupling the rotary displacement from the linear displacement of the rotary-linear displacement, comprising either a first measuring section which is coupled linearly in a fixed manner to the shaft to be measured and is read by the linear sensor, and a second measuring section which is exclusively coupled in a rotationally fixed manner to the shaft to be measured and is read by the rotary sensor, or a first measuring section which is exclusively coupled linearly in a fixed manner to the shaft to be measured and is read by the linear sensor, and a second measuring section which is coupled in a rotationally fixed manner to the shaft to be measured and is read by the rotary sensor.

The inventive decoupling of the linear displacement from the rotary displacement makes it possible to detect the linear displacement separately from the rotary displacement and to use standard high-resolution sensors for this purpose.

The decoupling device preferably has a linear spherical liner. This can be used for achieving a clear separation of the linear displacement from the rotary displacement in a precise and relatively cost-effective manner.

In accordance with one development, the first measuring section can be coupled in a fixed manner to the shaft to be measured, constructed hollow-cylindrically and coupled in its interior in a rotationally fixed manner to the second measuring section via the linear spherical liner. This type of construction makes it possible to implement an axially relatively short measuring system.

Furthermore, the first measuring section can have annular grooves on its outer jacket. The linear sensor is thus able to detect a linear displacement independently of rotary displacements.

According to a further embodiment, the second measuring section has a sensor shaft with a rotary sensor wheel. Such rotary sensor wheels ensure a high resolution with regard to the angle of rotation.

Furthermore, the rotary sensor can be a hollow-shaft sensor in the interior of which the second measuring section is arranged. This type of construction has the advantage that the shaft can be pulled out of the machine backward, i.e. through the measuring system, especially in the case of injection molding machines.

If the decoupling device has a linear spherical liner and the rotary sensor is a hollow-shaft sensor, it is advantageous if the surface of the linear spherical liner forms the second measuring section. As a rule, this makes it possible to save axial construction space.

According to a further embodiment, a measuring shaft is permanently coupled to the shaft to be measured, on the one part of which measuring shaft the linear spherical liner runs and the other part of which comprises the first measuring section. As a result, the two sensors can be arranged axially behind one another so that it may be possible to save radial construction space.

It is particularly advantageous to use the measuring system described above for a rotary-linear drive wherein the signals of the linear sensor and of the rotary sensor are used for controlling the rotary-linear drive. This makes it possible to achieve very accurate control.

BRIEF DESCRIPTION OF THE DRAWING

The present invention will be explained in greater detail with reference to the attached drawings, in which.

DETAILED DESCRIPTION OF PREFERRED EMBODIMENTS

The exemplary embodiments described in greater detail in the text which follows represent preferred embodiments of the present invention.

Figure 1:
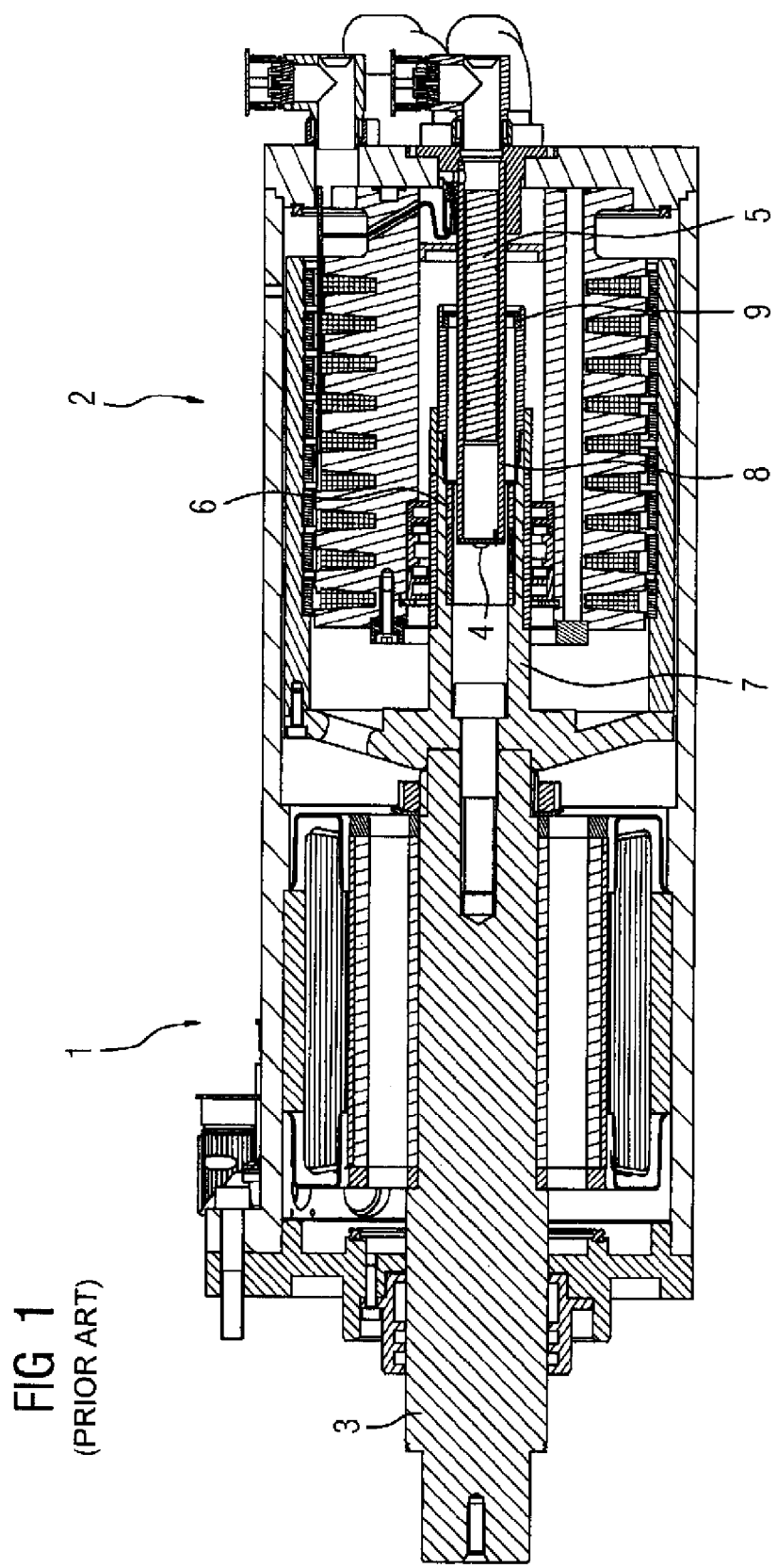
FIG. 1 shows a longitudinal section through a rotary-linear drive according to the prior art.
Figure 2:
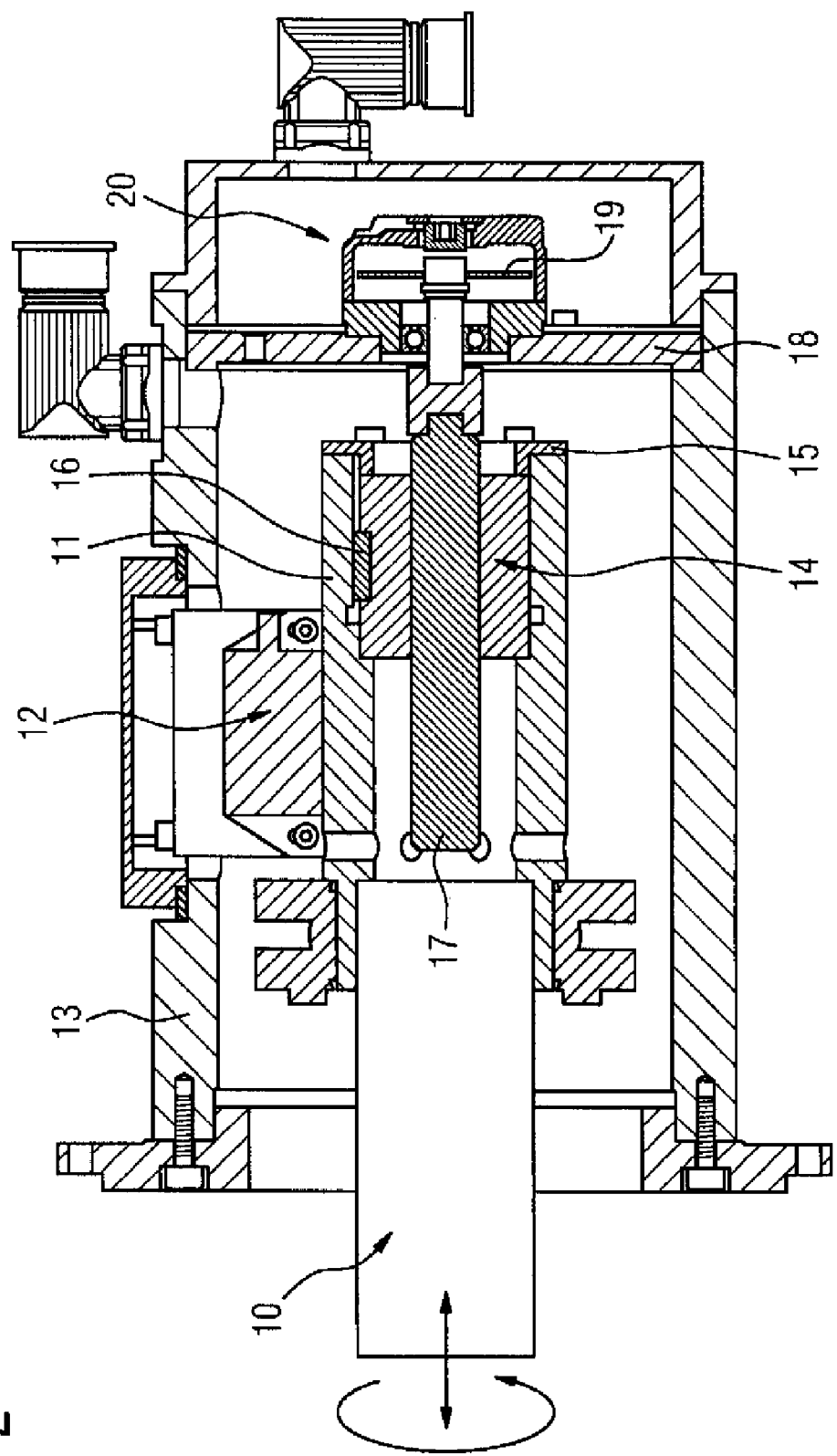
FIG. 2 shows a measuring system according to the invention corresponding to a first embodiment.

FIG. 2 shows a measuring system which can measure or detect the rotary-linear displacement of a shaft 10. The shaft 10 is, for example, a part of a drive of an injection molding machine. A sleeve 11 which performs the same rotary-linear displacement of the shaft 10 is coupled to the front end of the shaft 10. Annular grooves (in this case the first measuring section), which are not shown in FIG. 2, are milled into the sleeve 11. The annular grooves of the sleeve 11, or their displacement, respectively, are detected by a rotationally invariant rotary sensor 12. The latter is mounted on the housing 13 of the measuring system. Since the annular grooves surround the jacket of the sleeve 11 in the circumferential direction, the measurement signal of the linear sensor 12 is independent of the rotation of the sleeve 11 and thus of the shaft 10.

In the interior of the sleeve 11, a linear spherical liner 14 is mounted. In the present example, it is mounted by a pressure ring 15 which holds the linear spherical liner 14 in a turned-out part of the sleeve 11. An anti-rotation element 16 ensures that the linear spherical liner 14 is connected in a rotationally fixed manner to the sleeve 11. In the interior of the linear spherical liner 14, a grooved shaft 17 can move which is here also called a sensor shaft. The grooved shaft 17 is connected in a rotationally fixed manner to the sleeve 11 and thus also to the shaft 10 via the linear spherical liner 14. With regard to the linear displacement, however, the grooved shaft 17 is decoupled from the shaft 10.

The grooved shaft 17 is also rotatably supported in a bearing shield 18 of the measuring system and drives a sensor wheel 19 (together with the grooved shaft in the present case: second measuring section) of a rotary sensor 20. In this arrangement, the grooved shaft 17 is axially immovable.

Due to the mechanical decoupling of the linear displacement from the rotary displacement, standard rotary sensors can be advantageously used which have been found to be successful in such applications and which have a very high rotary resolution. Such a standard sensor is shown diagrammatically in the example of FIG. 2. Standardized high-resolution systems can also be used for the linear sensor 12.

Figure 3:
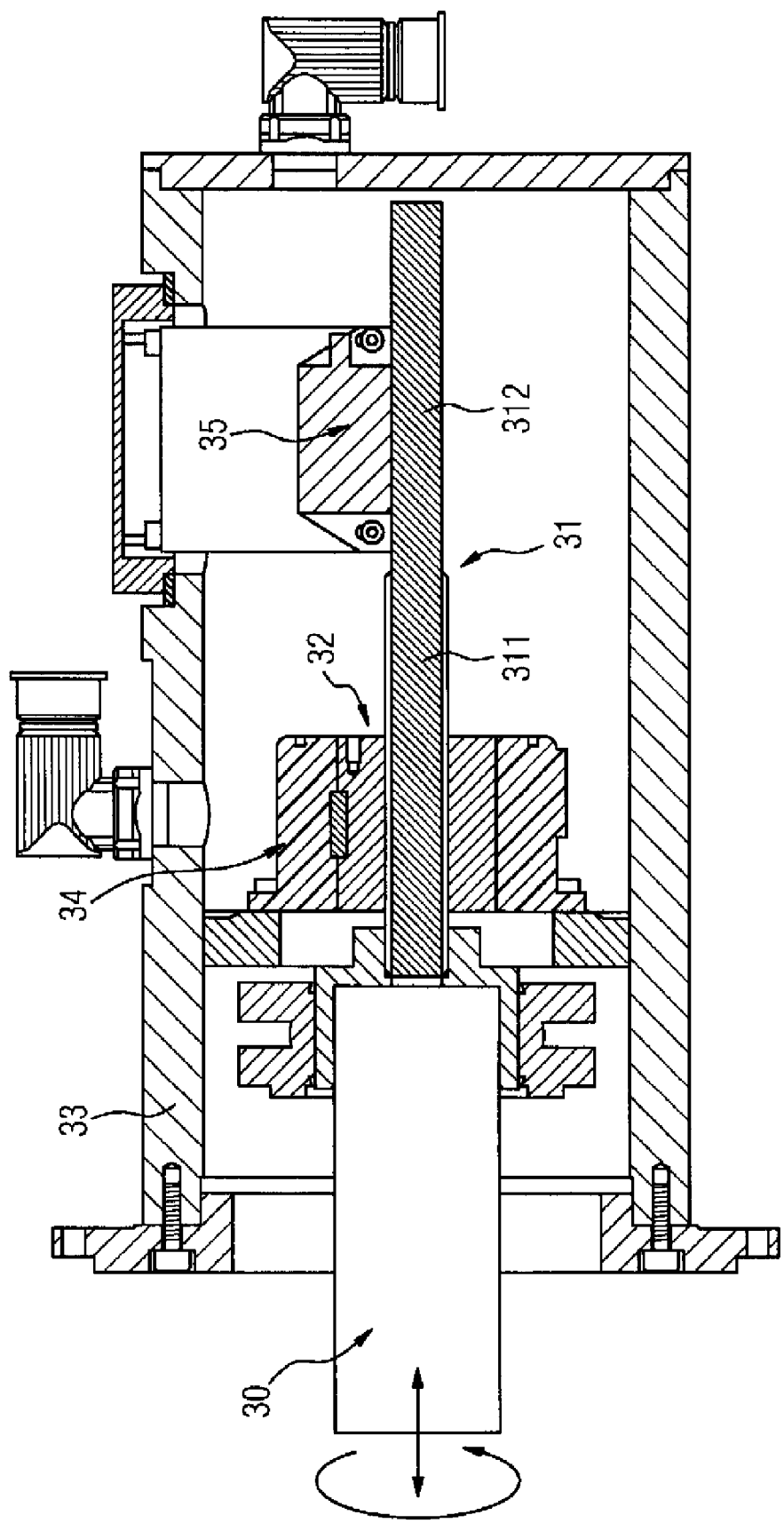
FIG. 3 shows a measuring system according to the invention corresponding to a second embodiment.

FIG. 3 shows a second exemplary embodiment of a measuring system according to the invention. The figure again shows a longitudinal section through the measuring system. A measuring shaft 31 is here permanently coupled in axial extension to the shaft 30 performing a rotary-linear displacement. It performs the same rotary-linear displacement as the shaft 30. The measuring shaft 31 has a first fixed shaft section 311 which is provided with axially extending grooves. This grooved-shaft section 311 is surrounded by a linear spherical liner 32. Although the latter is connected in a rotationally fixed manner to the grooved-shaft section 311, it is decoupled linearly from it. A rotary hollow-shaft sensor 34 mounted on the housing 33 of the measuring system surrounds the linear spherical liner 32 at a defined distance and scans its surface (the second measuring section in the present case). The linear spherical liner 32 is held in the interior of the rotary hollow-shaft sensor 34 by suitable means which are not shown in FIG. 3. The linear spherical liner 32 produces a mechanical decoupling of the rotary displacement from the linear displacement as in the example of FIG. 2 so that a standardized high-resolution rotary sensor 34 can be used.

To detect the linear displacement, the measuring shaft 31 has in axial extension of the grooved-shaft section 311 a measuring section 312 (the first measuring section in the present case). This measuring section 312 has annular grooves which are read by a rotationally invariant linear sensor 35 arranged radially over them. Since the annular grooves, in turn, extend in the circumferential direction of the measuring shaft 31, the linear displacement of the measuring shaft 31, and thus also of the shaft 30, can be measured by means of the displacement of the grooves of the measuring section 312. For this purpose, a high-resolution rotary-linear sensor 35 can be used.

The embodiment according to FIG. 3 has the further advantage that, with a suitable radial dimensioning of the measuring shaft 311 of the linear spherical liner 32 and of the sensors 34 and 35, the shaft 30 can be pulled out through the measuring system since no axially arranged sensor is provided. This pulling-out to the rear is helpful especially when cleaning or exchanging feed screws of an injection molding machine.

Figure 4:
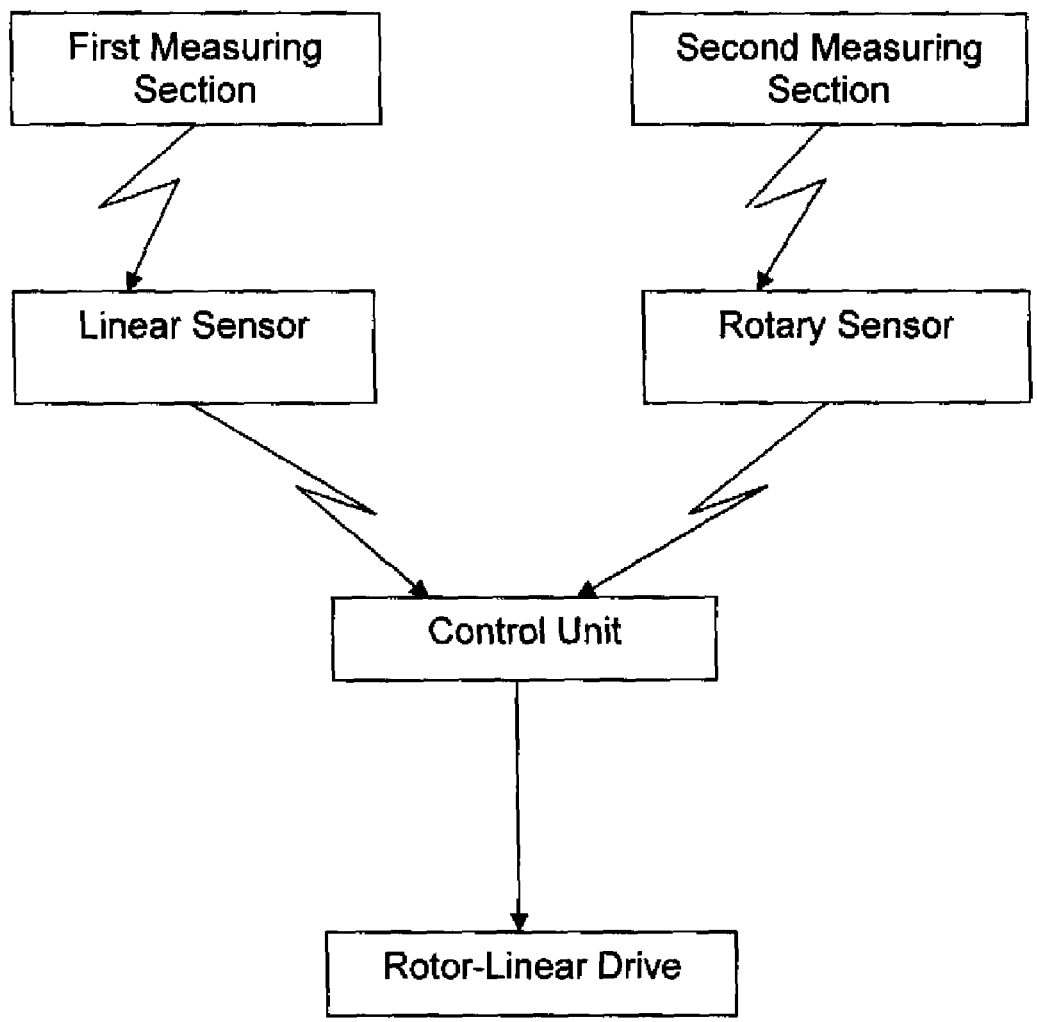
FIG. 4 is a block diagram showing the relationship and operation of the components of the measuring system.

FIG. 4 is a block diagram showing the relationship and operation of the components of the measuring system for use in a rotary-linear drive, wherein signals of the linear sensor and of the rotary sensor are transmitted to a control unit for controlling the rotary-linear drive.

What is claimed is:

1. A measuring system for detecting a rotary-linear displacement of a shaft, said measuring system comprising:
   a linear sensor detecting a linear displacement of the rotary-linear displacement;
   a rotary sensor detecting a rotary displacement of the rotary-linear displacement, said rotary sensor being a hollow-shaft sensor having an interior for accommodation of the second measuring section; and
   a decoupling device decoupling the rotary displacement from the linear displacement of the rotary-linear displacement, said decoupling device including a first measuring section which is coupled linearly in a fixed manner to the shaft to be measured and read by the linear sensor, and a second measuring section which is coupled in a rotationally fixed manner to the shaft to be measured and read by the rotary sensor, wherein the coupling of one of the measuring sections to the shaft is exclusive, wherein the decoupling device has a linear spherical liner received in the hollow-shaft sensor and having a surface to define the second measuring section.

2. The measuring system of claim 1, wherein the first measuring section is exclusively coupled linearly in a fixed manner to the shaft to be measured, while the second measuring section is coupled in a rotationally fixed manner to the shaft to be measured.

3. The measuring system of claim 1, wherein the second measuring section is exclusively coupled in a rotationally fixed manner to the shaft to be measured, while the first measuring section is coupled linearly in a fixed manner to the shaft to be measured.

4. The measuring system of claim 1, wherein the decoupling device has a linear spherical liner.

5. The measuring system of claim 1, wherein the first measuring section has an outer jacket formed with annular grooves.

6. The measuring system of claim 1, wherein the second measuring section has a sensor shaft with a rotary sensor wheel.

7. The measuring system of claim 1, wherein the decoupling device includes a measuring shaft which is coupled in a fixed manner to the shaft to be measured, said measuring part having a first part on which the linear spherical liner runs and a second part which comprises the first measuring section.

8. The measuring system of claim 4, wherein the first measuring section is constructed hollow-cylindrically and has an interior which accommodates the linear spherical liner to thereby coupled the first measuring section in a rotationally fixed manner to the second measuring section.

9. The measuring system of claim 4, wherein the linear spherical liner has a surface to define the second measuring section.

10. A rotary-linear drive comprising:
a measuring system for detecting a rotary-linear displacement of a shaft, said measuring system comprising a linear sensor generating a first signal representative of a linear displacement of the rotary-linear displacement, a rotary sensor generating a second signal representative of a rotary displacement of the rotary-linear displacement, said rotary sensor being a hollow-shaft sensor having an interior for accommodation of the second measuring section, and a decoupling device decoupling the rotary displacement from the linear displacement of the rotary-linear displacement, said decoupling device including a first measuring section which is coupled linearly in a fixed manner to the shaft to be measured and read by the linear sensor, and a second measuring section which is coupled in a rotationally fixed manner to the shaft to be measured and read by the rotary sensor, wherein the coupling of one of the measuring sections to the shaft is exclusive; and
a control device receiving the first and second signals from the linear sensor and the rotary sensor to control the rotary-linear drive,
wherein the decoupling device has a linear spherical liner received in the hollow-shaft sensor and having a surface to define the second measuring section.

11. The rotary-linear drive of claim 10, wherein the first measuring section is exclusively coupled linearly in a fixed manner to the shaft to be measured, while the second measuring section is coupled in a rotationally fixed manner to the shaft to be measured.

12. The rotary-linear drive of claim 10, wherein the second measuring section is exclusively coupled in a rotationally fixed manner to the shaft to be measured, while the first measuring section is coupled linearly in a fixed manner to the shaft to be measured.

13. The rotary-linear drive of claim 10, wherein the decoupling device has a linear spherical liner.

14. The rotary-linear drive of claim 10, wherein the first measuring section has an outer jacket formed with annular grooves.

15. The rotary-linear drive of claim 10, wherein the second measuring section has a sensor shaft with a rotary sensor wheel.

16. The rotary-linear drive of claim 10, wherein the decoupling device includes a measuring shaft which is coupled in a fixed manner to the shaft to be measured, said measuring part having a first part on which the linear spherical liner runs and a second part which comprises the first measuring section.

17. The rotary-linear drive of claim 13, wherein the first measuring section is constructed hollow-cylindrically and has an interior which accommodates the linear spherical liner to thereby coupled the first measuring section in a rotationally fixed manner to the second measuring section.

18. The rotary-linear drive of claim 13, wherein the linear spherical liner has a surface to define the second measuring section.

* * * * *